United States Patent [19]

Anastassiou

[11] Patent Number: 4,546,385
[45] Date of Patent: Oct. 8, 1985

[54] DATA COMPRESSION METHOD FOR GRAPHICS IMAGES

[75] Inventor: Dimitris Anastassiou, Long Island City, N.Y.

[73] Assignee: International Business Machines Corporation, Armonk, N.Y.

[21] Appl. No.: 509,837

[22] Filed: Jun. 30, 1983

[51] Int. Cl.[4] .............................................. H04N 7/12
[52] U.S. Cl. .................................. 358/133; 358/260; 358/96
[58] Field of Search ............... 358/133, 135, 136, 137, 358/138, 262, 280, 282, 283, 284, 261, 260, 96

[56] References Cited

U.S. PATENT DOCUMENTS

| | | | |
|---|---|---|---|
| 3,670,096 | 6/1972 | Candy et al. | 358/136 |
| 4,006,298 | 2/1977 | Fowler et al. | 358/240 |
| 4,115,816 | 9/1978 | Moe et al. | 358/283 |
| 4,117,470 | 9/1978 | Elliott | 340/324 |
| 4,210,936 | 7/1980 | Cinque | 358/283 |
| 4,229,768 | 10/1980 | Kurahayashi et al. | 358/261 |
| 4,259,694 | 3/1981 | Liao | 358/283 |
| 4,266,299 | 5/1981 | Chai et al. | 358/138 |
| 4,280,144 | 7/1981 | Bacon | 358/280 |
| 4,339,774 | 7/1982 | Temple | 358/283 |

OTHER PUBLICATIONS

IBM Technical Disclosure Bulletin by J. L. Mitchell, "Vertical Reference Coding for Digital Gray-Level Images", vol. 22, No. 7, Dec. 1979, pp. 2980-2985.
"Bit-Plane Encoding of Continuous-Tone Pictures", by D. R. Spencer et al., Proceedings of the Symposium of Computer Processing in Communications, Apr. 8, 1969, vol. 19, Microwave Research Institute Symposia Series.
"Data Filter and Compression Apparatus and Method", Ser. No. 429,658, Filed 9/30/82 by W. B. Pennebaker et al.

Primary Examiner—Howard W. Britton
Assistant Examiner—Victor R. Kostak
Attorney, Agent, or Firm—George E. Clark; Thomas P. Dowd

[57] ABSTRACT

Graphic images are generally considered to be those images comprised of text and/or drawings. Data compression of graphics images is desired whenever a fast image transmission speed is desired in a limited band width channel. It is also used for storage of a large number of images in a limited capacity storage system. A high compression ratio is achieved by thresholding the graphics image to a bilevel black-white image at one bit per pixel and then employing a second data compression on the black-white image. At low resolution, bi-level images have poor quality at edges and a quality improvement is needed. The data compression apparatus and method disclosed separates the graphics image into at least first and second bit planes identifies edge pixels from the first bit plane indicating a black/white change, locates the edge pixels and generates at least a single bit for each edge pixel indicating whether the edge pixel has a maximum intensity value such as black or white or an intermediate gray intensity value. Intermediate values are not allowed except at edge pixels which enhances both quality and compressibility of the resulting graphics image.

8 Claims, 4 Drawing Figures

DATA COMPRESSION METHOD FOR GRAPHICS IMAGES

BACKGROUND OF THE INVENTION

1. Field of the Invention

The present invention relates to image data enhancement and compression methods and more particularly to methods of filtering data for enhancement and compression of graphic images and for efficient data storage and transmission.

2. Description of Prior Art

In the prior art there many image data compression methods. The following are systems representative of the prior art.

A paper by Spencer and Huang, presented at the Symposium on Computer Processing in Communications, Apr. 8-10, 1969, addresses the problem of transforming a gray scale image to an equivalent set of black/white images called bit planes. Although the paper discusses bit plane encoding and choice of code for efficient compression, the paper does not show a method for compressing edge pixel data in a second bit plane of a graphics image based on a determination of the first bit plane intensity value of each pixel.

Co-pending U.S. application Ser. No. 429,658, assigned to the same assignee as the present application describes a filter for gray scale image data which forces a least significant bit of a current pixel to be equal to a most significant bit of the current pixel in a two bit per pixel code when the most significant bit of the current pixel is equal to the most significant bit of a previous and a next pixel on the current scan line of an image. The method of this patent employs horizontal redundancy to filter abrupt changes in gray scale pixel values along a scan line. The patent does not show a method for compressing edge pixel data in a second bit plane of a graphics image by determining whether the edge pixel under consideration has a maximum intensity value such as black or white or an intermediate intensity value.

An article in the IBM Technical Disclosure Bulletin, Vol. 22, No. 7, December 1979, at page 2980 and following shows a method for coding gray scale image data employing a vertical redundancy scheme. The publication shows a method for coding pixel values for gray level runs of pixels along a line by comparing the value on the current line to the value on the line above in the image. The publication does not show a method for compressing edge pixel data in a second bit plane of a graphics image by determining whether the edge pixel under consideration has a maximum intensity value such as black or white or an intermediate intensity value.

U.S. Pat. No. 4,006,298 generally discloses a system having an image gray scale using 64 discrete levels of brightness. The patent does wnot show a method for compressing edge pixel data in a second bit plane of a graphics image by determining whether the edge pixel under consideration has a maximum intensity value such as black or white or an intermediate intensity value.

U.S. Pat. No. 4,177,470 shows a system wherein a binary data signal is operated on to reduce the number of bits in the signal without reducing information content of the signal. The patent shows basically a data compression system. The patent does not show a method for compressing edge pixel data in a second bit plane of a graphics image by determining whether the edge pixel under consideration has a maximum intensity value such as black or white or an intermediate intensity value.

U.S. Pat. No. 4,210,936 shows a method and apparatus which achieves compression of image data by a reduction matrix which utilizes less gray scale data than is generated from the original picture element matrix. For example, if a picture element gray level required four bits of data, then the reproduction of the gray scale requires only one bit of data. The patent does not show a method for compressing edge pixel data in a second bit plane of a graphics image by determining whether the edge pixel under consideration has a maximum intensity value such as black or white or an intermediate intensity value.

U.S. Pat. No. 4,229,768 teaches an apparatus which compresses binary image signals by a selective run length compression technique. The patent does not show a method for compressing edge pixel data in a second bit plane of a graphics image by determining whether the edge pixel under consideration has a maximum intensity value such as black or white or an intermediate intensity value.

U.S. Pat. No. 4,280,144 discloses apparatus and method for improving quality of a coarse scan, line print image processing system. An encoder assigns a code to a coarsely scanned picture element representative of the reflectance characteristic thereof. For fine reproduction of coarsely scanned data, the coarsely scanned picture element is summed with at least four adjacent horizontal and vertical picture elements to reproduce a fine picture element comprising at least four sub-elements. Although the patent obtains information for determining a fine value of a particular picture element from adjacent picture elements, the patent in effect teaches a method for expanding data from a coarse scan to a fine representation and does not in fact filter image data. The patent does not show a method for compressing edge pixel in a second bit plane of a graphics image by determining whether the edge pixel under consideration has a maximum intensity value such as black or white or an intermediate intensity value.

The prior art discussed above does not teach nor suggest the present invention as disclosed and claimed herein.

SUMMARY OF THE INVENTION

Therefore, it is a primary object of the present invention to compress data in a graphics image encoded into a form having at least first and second bit planes, using the correlation among the bit planes, by a method including the following steps: identifying edge pixels from an encoding or decoding of the first bit plane of the image; locating the edge pixels and generating at least a single bit for each of the edge pixels; and indicating whether each edge pixel has a black/white intensity value or a gray intensity value by the binary state of the single bit based upon a comparison of the corresponding bits in the first and second bit planes. The coding of the compressed second bit plane using the single bits assumes that no intermediate (gray) levels exist except at edge pixels. If the graphics image contains more than two bit planes, then the method of the present invention can be generalized by increasing the number of bits generated for each edge pixel.

Accordingly, the data compression apparatus and method disclosed separates the graphics image into at least first and second bit planes, identifies edge pixels from the first bit plane indicating a black/white change, locates the edge pixels and generates a single bit for each edge pixel, which bit in the compressed second bit plane indicates whether the edge pixel has a maximum intensity value such as black or white or an intermediate gray intensity value.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF A PREFERRED EMBODIMENT OF THE INVENTION

Figure 1:
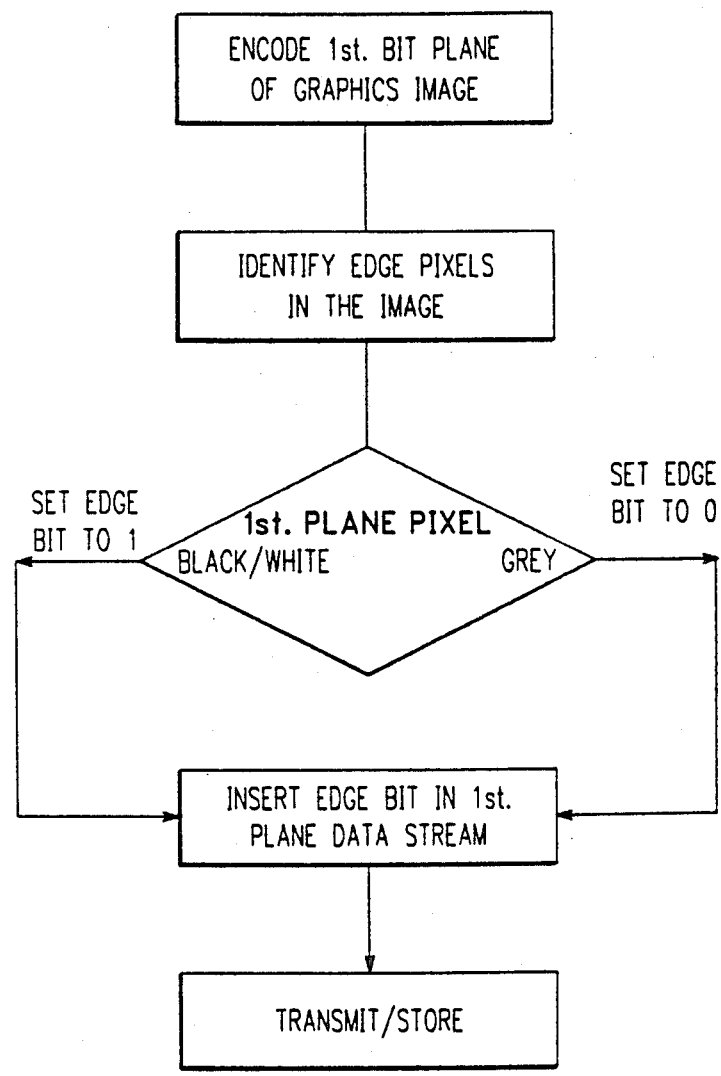
FIG. 1 is a flow chart of the method according to the present invention.

The present invention presents a solution to a significant problem of data compression of graphics images with high quality. Graphics images are considered to be those containing useful information in the form of text or figures and are intended to be bilevel in nature even though the raw data captured by a camera or other input device is multilevel. Although prior art compression algorithms for gray scale images such as photographs can work for scanned graphics images, a great deal of unnecessary data is transmitted. This excess data can be eliminated by the use of higher data compression ratios for graphics images. Significantly higher compression ratios may be achieved by first thresholding the original image and transforming it to a bilevel black/white image at one bit per pixel and then employing further data compression methods on the black/white image.

Bilevel images, however, have good quality only at high resolution. At low resolution, the character edges look ragged or staircase and the thickness of the character strokes is nonuniform. In these cases, a quality improvement is required.

By using generalized thresholding methods that permit a number of possible gray scale levels greater than 2, the image is significantly improved. The apparent effect on image quality is very similar to that of increased resolution keeping the bilevel format. Use of four gray scale levels would require coding of two bits per pixel corresponding to two bilevel images called "bit planes. A normal binary code or a Gray code may be used as in the following table.

TABLE I

|  | Normal | | Gray code | |
|---|---|---|---|---|
|  | 1st | 2nd | 1st | 2nd |
| BLACK | 1 | 1 | 1 | 0 |

TABLE I-continued

|  | Normal | | Gray code | |
|---|---|---|---|---|
|  | 1st | 2nd | 1st | 2nd |
| GRAY BLACK | 1 | 0 | 1 | 1 |
| GRAY WHITE | 0 | 1 | 0 | 1 |
| WHITE | 0 | 0 | 0 | 0 |

A straightforward coding is the application of a bi-level or black/white compression method twice, once for each bit plane. Spencer and Huang discussed above in the prior art section have shown that the second bit plane is gray code format compresses slightly better than in normal binary code format. In either case, the total encoding rate as measured in bits per pixel, using independent coding of the two planes, is usually at least twice as large as it would be for coding the first bits plane only, which means that it requires more bit to encode the second bit plane than it takes to encode the first bit plane.

In the previously-mentioned application (Ser. No. 429,658) a method is proposed to filter the second bit plane to permit intermediate or gray level intensity values in the second bit plane to occur only for those pixels for which a transition in the value of the first bit plane has occurred along a raster scan line. For example, in the following configuration of the first bit plane along a scan line, only the pixels marked by * (called the edge pixels) can have a Gray code second bit plane value of one, that value being forced to zero for other pixels.

```
0 0 0 0 0 0 1 1 0 0 0 0 1 0 0 0 0 1 1 1 1 0 0
* * * *      * * *    * *    * *
```

The filter method of the application discussed above achieves better quality by eliminating noise in the background, that is, outside the area of the graphics information, while retaining the desired effect of the intermediate intensity levels around the edges of elements such as printed characters. It also improves the compression ratio for the second bit plane for the same reason.

The present invention recognizes and makes use of the high correlation between the first and second bit planes of the bilevel representation for each pixel in the graphics image.

It should be noted that bits in the first bit plane are generally referred to as the most significant bits and bits in the second bit plane are generally referred to as the least significant bits. Referring to Table I above, it can be seen that if the most significant bit has a binary state of one, then the pixel is dark gray or black and if the most significant bit is a zero, then the pixel is light gray or white. The two intermediate or gray values of the pixel are determined by the least significant bit or the second bit plane.

After the encoding of the first bit plane by any method known in the prior art, some of which having been discussed in the above-mentioned U.S. application, the locations of the edge pixels are known since edge pixels are defined as those pixels where there is a change in the binary value of the first bit plane, or most significant, bits from either 1 to 0 or 0 to 1. An edge bit can be generated for each edge pixel and stored for transmitted with the first bit plane data to indicate for each pixel in raster scan order whether the pixel has an extreme (black or white) value or an intermediate (dark or light gray) value. The generated edge pixel bit may be inserted in the compressed bit stream of the first bit plane as the filtered image data is read from the buffer storage.

Figure 2:
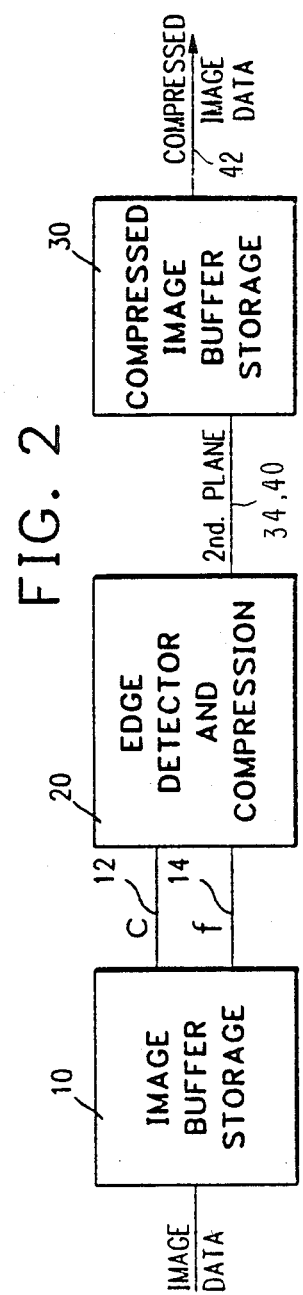
FIG. 2 is a block diagram of apparatus according to the present invention.
Figure 3B:
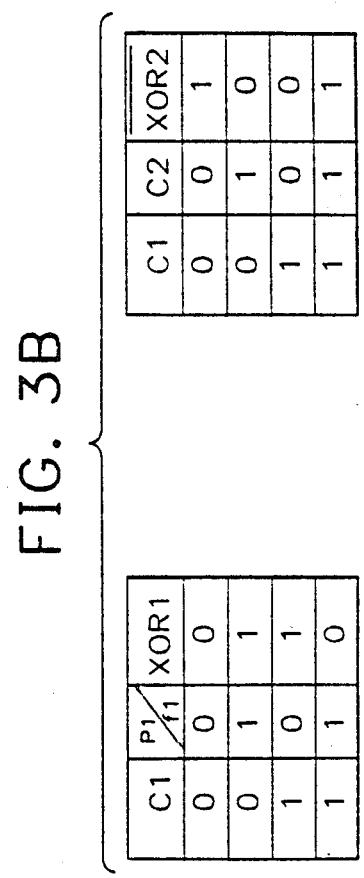
FIG. 3B is a table showing the transfer functions of the apparatus of FIG. 3A.
Figure 3A:
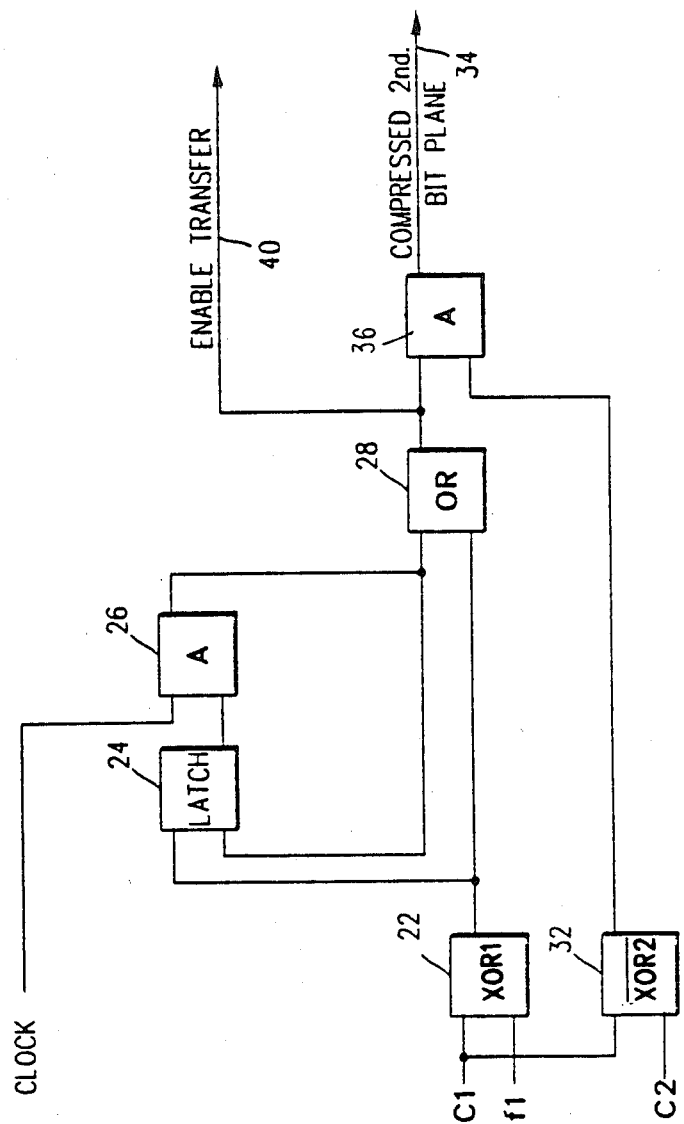
FIG. 3A is a schematic diagram illustrating the preferred components of an edge detector and compressor according to the present invention.

Referring now to FIGS. 1, 2, 3A and 3B, a preferred embodiment of the method and apparatus of the present invention will be described. After encoding of the first bit plane of the graphics image, the first bit plane data is stored in image buffer 10 (FIG. 2). The most significant bit of the current pixel c is output on line 12 as a first input to edge detector and second bit plane compressor 20 and the most significant bit of the following pixel f is output on line 14 as a second input to edge detector and second bit plane compressor 20. As seen in FIG. 3A, an exclusive OR 22 (XOR1) in detector and compressor 20 compares the first bit plane bits c1 on line 12 and f1 on line 14 and in combination with Latch 24, in a manner described more fully below, identifies edge bits according to the following equation:

$$E = (c \text{ xor } f) \text{ or } (c \text{ xor } p)$$

Where
c is the first plane bit of the current pixel;
f is the first plane bit of the following pixel; and
p is an indication of the first plane bit of the previous pixel stored in Ratch 24.

As is shown in FIGS. 3A and 3B, the output of OR 28, the edge detector, is zero when the current pixel, the previous pixel and the following pixel are the same. However, the output is equal to one when there is a difference between the current pixel, the previous pixel and the following pixel first plane bits, indicating an edge pixel.

The edge bit, indicating an edge pixel, is the only bit required to be stored or transmitted for the second bit plane. Thus, only edge bits for the edge pixels in the image, are stored in image buffer storage 30 (FIG. 2) until required for transmission on compressed image data line 42 at which time these edge bits of compressed image data are inserted in the data stream for the first bit plane at locations adjacent to the edge pixel bits (or black/white change bits) of the first bit plane. If the first bit plane is encoded by a run length code, the second plane edge bits can be inserted in the data stream after each run length code word. Generally there are two edge pixels for each edge as will be seen from the above scan line example. However, for a run of length 1, which must be considered to have two edges, only 3 edge pixels need be encoded rather than four.

Referring now to FIGS. 3A and 3B, a hardware embodiment of the present invention will be described.

The most significant bit of the current pixel c1 and of the following pixel f1 are compared in exclusive OR 22. FIG. 3B shows the output of XOR1 (22) as being a 1 when c1 is different from f1, indicating an edge. The output of XOR1 is connected to an input of OR 28 and to an input of Latch 24. Latch 24 stores the comparison of the previous pixel first plane bit p1 with c1. At the time of the comparison of the current pixel c1 with the following pixel f1, the output of Latch 24 may also be gated through AND 26 to an input of OR 28 if the comparison, and thus the output of XOR1, differs from the previous output. Consequently, OR 28 outputs a 1 if there is a difference between c1 and either f1 or p1. An output of a 1 from OR 28 indicates an edge pixel and raises enable transfer line 40. An output of 1 from OR 28 may also gate AND 36 to output the value of the compressed second plane bit on line 34 to storage 30 (see FIG. 2) in the manner as follows.

Concurrently, with the comparison in OR 22, c1 is compared with the second plane bit c2 of the current pixel in exclusive OR 32 (XOR 2) to determine if the current pixel has: an extreme intensity value, i.e., black or white, in which case c2 equals c1 (see TABLE I); or, an intermediate intensity value (gray), in which case c2 is different from c1. When an extreme value is present, it will be seem from FIG. 3B that XOR2 will output a 1, and a 0 will be output for a gray value.

The output XOR2 is connected along with the output of OR 28 to an input of And 36. The output of XOR2 will be gated out on line 34 to storage 30 only when it is a 1 and enable transfer line 40 is raised indicating an edge bit. Thus, when an edge bit is indicated by an output on line 40, whether it is an extreme or a gray value will be indicated by a 1 or a 0 output, respectively, on line 34. Accordingly, lines 34 and 40 combine to provide a second bit plane input to image buffer storage 30 from which this compressed edge bit and value data may be output for insertion in the first bit plane data stream. Hence, as bits will only be produced in the compressed second bit plane for edge pixels, the setting of these bits to 1 or 0 can be used to differentiate between extreme and gray color edge pixels.

The method and apparatus according to the present invention substantially reduces transmission of any data for a second bit plane of a four level graphics image because the percentage of edge pixels compared to the total number of pixels is very small, on the order of 6%. If desired, further data compression techniques could be applied to those bits representing second plane edge information. As described above, and only bits that must be transmitted for the second bit plane are those which represent a change in the first bit plane (or effectively an edge).

Thus, while the invention has been described with reference to preferred embodiments thereof, it will be understood by those skilled in the art that various changes in form and details may be made without departing from the scope of the invention.

What is claimed is:
1. A method for compressing data representing a graphics image encoded in binary form having at least first and second bit planes respectively containing a most significant bit and at least significant bit for each pixel in the image indicating whether the pixel has an extreme intensity value or one of two intermediate intensity values, comprising the steps of:
   identifying edge pixels from the change in value of the binary state of successive bits in said first bit plane of said image;
   generating at least a single binary bit for each adjacent edge pixel so identified;
   comparing the bits in the first and second bit planes for each of said edge pixels to determine the binary state of each of said binary bits generated, for indicating by said state whether each edge pixel has an extreme intensity value or an intermediate intensity value; and
   replacing said second bit plane with said indicative binary bits to compress the image data.
2. A method according to claim 1, comprising the further step of inserting said indicative binary bits adjacent their respective edge pixel most significant bits for transmission with the first bit plane data.

3. A method according to claim 1, wherein said identifying and said generating are accomplished by the step of performing a logical exclusive OR on the most significant bits of the intensity values of a current pixel and an adjacent pixel.

4. A method according to claim 3, wherein said comparing step is accomplished by performing a logical exclusive OR on a most significant bit and a least significant bit of the intensity value of each of said edge pixels.

5. Apparatus for compressing binary data representing a graphics image having at least first and second bit planes respectively containing a most significant bit and a least significant bit for each pixel in the image, comprising: means for identifying edge pixels from the change in value of the binary state of successive bits in said first bit plane of said image; and means for comparing corresponding bits in said first and second bit planes for each said edge pixel and generating at least a single bit for each said edge pixel, indicating whether said edge pixel has a maximum intensity value or an intermediate inensity value, which single bits replace said second bit plane.

6. Apparatus according to claim 5, wherein said means for comparing and generating comprise means for performring a first logical exclusive OR on a most significant bit of an intensity value of a current pixel and an adjacent pixel.

7. Apparatus according to claim 6, wherein said means for comparing and generating further comprises means for performing a second logical exclusive OR on a most significant bit and a least significant bit of the intensity value of each of said edge pixels.

8. Apparatus according to claim 7, wherein said means for comparing and generating further comprises AND means for receiving the results of said first and second logical exclusive OR operations.

* * * * *